Patented Oct. 5, 1937

2,094,627

UNITED STATES PATENT OFFICE 2,094,627

COMPOSITION AND PROCESS OF MAKING SAME

Andrew Weisenburg, Baltimore, Md., assignor to Crown Cork & Seal Company, Inc., Baltimore, Md., a corporation of New York No Drawing. Application November 22, 1930, Serial No. 497,616. Renewed December 12, 1936

5 Claims. (Cl. 106—22)

The present invention relates to the manufacture of composition products and the method of making the same, and is primarily concerned with a cork composition or a composition having a granulated base of fibrous or other natural or artificial material.

The object of the invention is to produce an improved article which will possess resiliency i. e., the compressibility and rebound of the cork particles are maintained and enhanced, and strength, such as have heretofore been unattainable by conventional means.

A further object of the invention is to produce a cork composition article in either disc, sheet or block form composed of granulated cork, and which will possess an appearance and color comparable to that of the best natural cork, while having more desirable properties for the various specific purposes for which such materials are utilized.

In the manufacture of composition cork, the properties of the binder used to join the cork particles determine the physical and chemical properties of the resulting cork composition.

Briefly stated, the present invention comprises utilizing with the granulated cork or other material, as a binder and coating, two or more aldehyde condensation products with or without a protein and which have been found to impart to the cork a light color similar to that of natural cork, enhanced resiliency, excellent resistance against acid or alkali solution, unusual tensile strength and flexibility, freedom from any phenolic or objectionable odors, heat resistance to a very marked degree, and inhibit mold growth, particularly in damp atmospheres.

In the case of composition discs used as liners for caps for food products and particulary pressure and still beverages, these characteristics are advantageous, in that resiliency and tensile strength are required for effective sealing. For instance, in the case of beverages and food products, which are necessarily prepared and stored some time before use by the consumer, disintegration of the liner or disc cushion under the sealing pressure occurs and not only imperfect sealing results, but increased possibility of chemical action ensues, and in time the whole liner breaks down and destroys the contents. This difficulty is overcome with the present invention, in that the discs or liners have increased tensile strength and such enhanced resiliency or flexibility that under the sealing pressures, there is no tendency for cracking or disintegration. Stated briefly, the resiliency of the cork particles which form the body mass, i. e., preponderate in volume, is maintained and increased and the material is strengthened so that it stands up under the most extreme conditions of usage.

As a matter of fact, any binding material added to ground cork will produce a cork composition, or ground cork may be packed to such a degree that the natural resins in the cork will tend to bind the cork particles together under the influence of heat. But such cork compositions may be valueless, as they will not have the proper characteristics to make them satisfactory in the arts. For example, in using cork composition as a liner in a closure on or for a glass bottle, such closure will only be an effective seal as long as the cork composition used therein has proper resiliency, as the entire sealing properties of the closure are dependent upon this property in the cork composition. Insolubility and ability to resist the attack of acidulated and alkalinated materials, particularly with foods or beverages is likewise necessary and resistance to heat, as for example that of sterilization and cooking temperatures is essential. The use of phenol aldehyde alone I have found produces a characteristic phenol odor which is undesirable, and also seriously impairs resiliency and the color of the final product.

The above synthetic resin binder is mixed with ground cork in the usual manner, the proportion of binder to cork varying according to the characteristics required in the finished product, the cork predominating by volume.

In preparing my improved cork composition, the granulated cork or other material will be mixed with the chemical constituents which are prepared in the following manner.

One member of my composition will comprise a phenol formaldehyde condensation product which, as well known, has great strength as a binder and is insoluble in most liquids, acids and alkalies when finally set. However, such a product usually possesses a dark color, making it unsatisfactory for the production of discs or liners for use in connection with food products and more particularly pressure and still beverages.

While I have mentioned a phenol formaldehyde condensation product, it will be understood that I may employ any of the homologues of phenol and for the formaldehyde I may substitute equivalents thereof, such as paraformaldehyde or other aldehyde substances.

In preparing the condensation product and by way of example, I add twenty (20) parts forty per cent (40%) formaldehyde and one and one-half (1½) parts oxalic acid to twenty-six (26) parts ninety per cent (90%) phenol. These quantities are given merely as illustrations, since they can obviously be departed from.

The oxalic acid I have found acts as a catalyst and favorably influences the color of the resultant product and likewise its strength. In other words, a much paler or light colored resin is produced by the catalytic effect of the organic acid and the strength of the binder is improved. Moreover, the use of a catalyst, such as an organic acid, renders the resultant condensation product such that it may be readily mixed with other condensation products to produce the binder of this invention.

The above mixture is subjected to heat until the condensation product appears as a pale sticky mass. The reaction is then stopped by the addition of cold water. The resultant resin in its intermediate stage is washed and kneaded several times, first in cold water, and then in hot water, to which a little ammonia is added. This repeated washing eliminates all excess acid, and tends to remove the excess phenol. After the resin is washed, it is subjected to heat and the reaction carried to a point where the resin on testing a small sample, when cold, is hard and brittle and not tacky. At this point, by the addition of suitable plasticizer, such as diethylene, glycol, glycerine and other similar organic materials or combinations thereof, I obtain a solution of the resin in the plasticizer suitable for forming the necessary binder. Such a solution, moreover, will keep almost indefinitely in this state without change.

The second member of my composition comprises a urea aldehyde condensation product and while I shall mention by example urea and formaldehyde, I have found that various derivatives of urea, such as thio-urea, guanidine, and others may be satisfactorily employed, as well as derivatives of formaldehyde and its polymers.

In forming the second member twenty-four (24) parts of urea are dissolved in sixty (60) parts of forty per cent (40%) formaldehyde to which one part of commercial ammonia solution is added, and reacting under heat until a clear solution is obtained. Care must be taken that the reaction is not carried too far, since otherwise an insoluble urea condensation product may result. Such an insoluble mass must be avoided since otherwise it will not mix or go into solution with the phenol resin plasticizer solution or mixture. The proportions indicated above are given merely by way of example and can be departed from as required.

The clear condensation product thus produced and while still hot is mixed with the phenol formaldehyde plasticizer solution. The resultant mixture of phenol and urea resins will keep without change under normal conditions practically indefinitely.

The phenol and urea resins and plasticizer can be mixed in varying proportions, depending upon the characteristics and properties desired in the final binder composition, such as strength, flexibility, hardness, color and heat resistance. Obviously, the applications of the binder are so varied, that for the various purposes particular characteristics are required, and these can be easily adjusted by varying the proportions of the members of the mixture or solution.

To accelerate the setting of this synthetic resin binder and obtain its full efficiency in an economic time cycle, a hardening agent is preferably employed. I have found that organic acids are satisfactory for this purpose and preferably oxalic acid which, when the binder is employed in a cork composition, produces a light colored cork which is much desired. The oxalic acid is preferably dissolved in its own weight of a material which will also exert a further physical effect on the natural granulated material, such as cork, for example diethylene glycol or glycerine.

In referring to the use of an organic acid, both as a catalytic agent and as a hardening member, it will be understood that other acids, such as tartaric, citric, lactic, phthalic anhydride, acetic, particularly polybasic acids, have been found quite satisfactory for these functions.

For producing a cork composition satisfactory for a number of general purposes, and as merely illustrative of one example, fifty (50) parts by weight of cork are added to eighteen (18) parts of mixed resin binder dissolved in the plasticizer, as above described, and one and one-half (1½) parts of oxalic acid dissolved in a like amount of diethylene glycol. As will be clear, the cork predominates by volume and forms the body mass.

Such a composition will impart flexibility, great tensile strength and, moreover, the cork will possess a pleasing light color very similar to that of the natural product. Moreover, the binder will be resistant to the action of most fluids, its insoluble characteristic being extremely high, and will not be attacked by acid or alkali solutions. A further feature resides in the fact that phenolic or objectionable odors are eliminated, and mold growth, such as takes place in damp atmospheres, is entirely inhibited. The binding composition is, moreover, heat resistant to a remarkable degree, and, in this connection, it can be used satisfactorily in connection with internal engine gaskets and packings, as well as a liner or seal for food products and beverages, since it will withstand the high temperatures incident to sterilization and cooking.

It will be understood, moreover, while I have described the composition as peculiarly adapted for binding purposes with granulated materials, it likewise has distinct advantages as a coating or impregnation product, and will also form a base or ingredient for paints, varnishes and other coating preparations.

The final product when set is sufficiently hard and possessing the characteristics above outlined, will be useful in many applications.

I have found, furthermore, that the above solution of phenol and urea resin in plasticizers will mix with solutions of proteid substances, such as gelatine, casein, and albumen, as well as other proteins. The protein may be added to the phenol urea resin solution or a portion of the phenol urea resin solution may be added to a solution of the protein. In either case, it has been found that the mixed resin binder and the protein exert a very desirable effect when the binder is employed in producing a cork or other composition. In this connection, I have found that a satisfactory cork composition, for example, can be made with fifty (50) parts by weight of cork, fourteen (14) parts synthetic resin binder, four (4) parts of gelatin solution, and one and one-half (1½) parts of oxalic acid dissolved in a like amount of diethylene glycol. Likewise, it will be observed that the cork predominates by volume and constitutes the body mass.

It appears that the protein binder when used with the phenol urea resin binder has been found to exert an effect which has heretofore not been accomplished with known and conventional binding compositions.

The new composition, including the protein possessing all of the characteristics above described, increases the resiliency and flexibility of the resultant product and, moreover, for economic purposes in many instances, reduces expense. With a binding composition containing as much as fifty per cent (50%) gelatin solution, the properties of the synthetic resin binder have been found to be not materially altered, and such composition containing a relatively large proportion of the protein possesses all of the characteristics of tensile strength, insolubility, heat resistance, inhibition of mold growth, pleasant color, freedom from objectionable odors, and will not be attacked by acids and alkalies.

The binding composition of the present invention as will be understood when combined in the usual manner with the granulated material and subjected to heat and pressure, whereby the cork particles are closely compacted as understood in the art will produce a satisfactory binding agent, and likewise impart to the product all of the desirable properties which its association or application may require. Moreover, the granules or particles will be thoroughly coated, as well as bound together, and hence the use of the binder not only serves this function, but likewise acts as a protecting surface since many natural and artificial granulated products will be susceptible to acids, alkalies, and other possible chemical reaction with substances to which they may be exposed. This is particularly true in connection with food compounds, as well as pressure and still beverages and in connection with the latter, I have found that the present binder will overcome the heretofore extremely objectionable reactions due to the presence of tannic acid in the cork or other granular substance. I am not in a position to state definitely just how this much desired result is chemically attained, but from various tests using other synthetic resin binding agents, in comparison with the binding agent of the present invention, I have discovered that where heretofore albumen has been precipitated from beer by the reaction of the tannic acid in the cork, with the present invention this is overcome. I strongly believe that this beneficial result is attained by the addition of a protein substance to the aldehyde resin mixture.

In the use of the present invention, as stated, color which has heretofore been a serious obstacle in compounding such granular materials as cork and wood, has been effectively solved, in that the objectionable dark color of the phenol aldehyde condensation product is completely overcome.

Moreover, it will be understood that I have combined a phenol formaldehyde resin which inherently possesses great strength as a binder and is very insoluble and cannot be attacked by most acids and alkalies when finally set and a urea condensation product being a clear water colored resin with no odor, but not possessing quite as good insolubility and acid and alkali resistant qualities of the phenol resin. However, the combination of these two enables me to produce a final product having all of the requirements which are fully above set forth, and which, at the same time, is free from any objectionable odor.

The use of one of the members of the phenol aldehyde series mixed with one of the members of the urea aldehyde series I have also found enables the setting or curing of the resin mixture or the combined cork resin composition to be accomplished in an economic time cycle and the urea member operates to accelerate the curing in a most convenient and inexpensive manner. This is particularly advantageous in connection with cork compositions where I have found that the use of a phenol aldehyde alone prevents an economic curing or setting cycle.

The binding and coating composition herein described enables discs, rings and liner of various kinds formed of granulated cork or other material to be produced which will possess excellent color and appearance and, at the same time, have increased flexibility, resiliency and tensile strength.

The cork composition of this invention may be formed into cylinders, sheets or blocks, from which may be cut or stamped sealing liners or discs, as required. It will be understood that by adding the cork to the chemical mixture or solution, that a moldable composition is formed so that articles of various shapes and sizes can be produced with this invention.

The final product possessing the required resiliency and flexibility will have a glaze, due to the presence of a thin coating of the aldehyde or aldehyde protein mixture thereon, and it will be understood that articles from the composition may be made by conventional methods, such as by extrusion, or other molding apparatus to produce a closely compacted body.

A natural product such as cork disc, sheet, block or other articles may be coated with the mixture herein described to produce a protected surface, and it will be understood that the invention is not solely confined to use with granulated materials.

While I have indicated condensation products of the phenol and urea aldehyde series, it will be understood that I do not wish to be limited to these, since other synthetic resins may be substituted for one or both of the condensation products mentioned.

In the manufacture of articles from granulated cork and the binder herein disclosed, the resin plasticizer solution and granulated cork in the required proportions are mixed in a mechanical mixer until the cork particles are thoroughly coated. The cork binder mixture is then packed by a mechanical means in either tubes or molds under pressure, this pressure varying according to the density or property required in the finished product. The tube or mold is passed mechanically through an oven at temperatures from 250° to 350° F. and subjected to this temperature for a period varying from a few minutes to several hours. Time and temperatures are variants and will depend in many cases upon the size of the tube or mold.

The granulated cork binder mixture can also be extruded through a heated tube, in which tube the pressure is formed by the frictional resistance of the cork. The extruded end of the tube is usually cooled so that the cork composition is more or less set before leaving the extruding tube. This is done to prevent the swelling of the cork composition.

It will be understood that after the phenolic binder member has been cured or set, it is chemically inert, and hence the cork composition of this invention is useful as a liner for containers in medicines, foods, and any other products in which there are active chemical ingredients.

With respect to the solutions of protein substances, such as casein, gelatin, albumen and others, these may be dissolved in water, with or without the addition of various chemicals to accelerate the solution. The plasticizers, such as glycerine, diethylene glycol or combinations thereof, can also be added in varying quantities.

As one typical example, casein solution can be made up as follows: sixty (60) parts casein, one hundred (100) parts water, eighty (80) parts glycerine, and five (5) parts ammonia.

The proportions with which the various ingredients are combined, of course, are subject to great modification and change as has heretofore been described, and the claims appended are to be broadly construed.

What I claim is:

1. A composition of matter comprising granulated cork and a binder composed of a mixture of artificial resins in solution in a plasticizer, in proportions to produce an article adapted for use as a sealing material and having such tensile strength and resiliency that under sealing pressures there is no tendency for cracking or disintegration.

2. A composition of matter comprising granulated cork and a mixture of resins composed of a phenol aldehyde condensation product and a urea aldehyde condensation product and a plasticizer, in proportions to produce an article adapted for use as a sealing material and having such tensile strength and resiliency that under sealing pressures there is no tendency for cracking or disintegration.

3. A composition of matter comprising granulated cork and a binder composed of a mixture of artificial resins, a proteid and a plasticizer, in proportions to produce an article adapted for use as a sealing material and having such tensile strength and resiliency that under sealing pressures there is no tendency for cracking or disintegration.

4. A composition of matter comprising granulated cork and a binder composed of a mixture of artificial resins in solution in a plasticizer, in proportions to produce an article adapted for use as a sealing material and having such tensile strength and resiliency that under sealing pressures there is no tendency for cracking or distintegration, the composition consisting of substantially 50 parts cork and approximately 14 parts of the binder.

5. A composition of matter comprising granulated cork and a binder composed of a mixture of artificial resins and a plasticizer, in proportions to produce an article adapted for use as a sealing material and having such tensile strength and resiliency that under sealing pressures there is no tendency for cracking or distintegration, the composition consisting of substantially 50 parts cork and approximately 14 parts of the binder.

ANDREW WEISENBURG.